United States Patent
Narula et al.

[11] Patent Number: 6,153,555
[45] Date of Patent: Nov. 28, 2000

[54] SINGLE PHASE METAL-ALUMINA MATERIALS INCLUDING ALKALI METALS MADE FROM HETEROMATALLIC ALKOXIDES

[75] Inventors: Chaitanya Kumar Narula; Sabine Rita Nakouzi-Phillips, both of Ann Arbor, Mich.

[73] Assignee: Ford Global Technologies, Inc., Dearborn, Mich.

[21] Appl. No.: 09/184,269

[22] Filed: Nov. 2, 1998

[51] Int. Cl.[7] .............................. B01J 23/00; B01J 23/58; C04B 35/10; C10G 28/02; C01F 17/00

[52] U.S. Cl. ..................... 502/303; 502/328; 502/330; 502/332; 502/334; 502/339; 502/341; 502/346; 502/524; 501/12; 501/127; 501/153; 423/263; 423/600

[58] Field of Search ................. 502/303, 328, 502/330, 332, 334, 339, 341, 346, 524; 501/12, 153, 127; 423/263, 600

[56] References Cited

U.S. PATENT DOCUMENTS

| | | | |
|---|---|---|---|
| 3,903,122 | 9/1975 | Thomas | 556/179 |
| 4,244,986 | 1/1981 | Paruso et al. | 427/126.4 |
| 4,610,866 | 9/1986 | Debsikdar et al. | 423/600 |
| 4,704,266 | 11/1987 | Kadokura et al. | 423/600 |
| 4,752,462 | 6/1988 | Lipeles et al. | 423/600 |
| 5,023,071 | 6/1991 | Sherif | 423/592 |
| 5,132,253 | 7/1992 | Dawes | 501/12 |
| 5,134,107 | 7/1992 | Narula . | |
| 5,403,807 | 4/1995 | Narula . | |
| 5,744,118 | 4/1998 | Imamura et al. | 423/593 |
| 5,788,950 | 8/1998 | Imamura et al. | 423/593 |

FOREIGN PATENT DOCUMENTS

| | | |
|---|---|---|
| 787-522-A2 | 8/1997 | European Pat. Off. . |
| 7024316 | 1/1995 | Japan . |
| 10249199 | 9/1998 | Japan . |

OTHER PUBLICATIONS

C. K. Narula, et al., "Incorporation of lanthanides in alumina matrices by a sol–gel process employing heterometallic alkoxides M'Al(Opri)43, as precursors", Journal of Materials Chemstry, vol. 7, No. 9, 1997, pp. 1821–1829, XP002131596, Mar. 1997.

*Primary Examiner*—Mark L. Bell
*Assistant Examiner*—Patricia L. Hailey
*Attorney, Agent, or Firm*—Lorraine S. Melotik

[57] ABSTRACT

This invention is a single phase metal alumina material made by sol-gel techniques from certain heterometallic alkoxides which include aluminum and at least alkali metals, and optionally alkaline earth metals and lanthanide.

12 Claims, 2 Drawing Sheets

SINGLE PHASE METAL-ALUMINA MATERIALS INCLUDING ALKALI METALS MADE FROM HETEROMATALLIC ALKOXIDES

Reference is made to concurrently filed related application Ser. No. 09/184,146 entitled "Use of Sol-Gel Processed Alumina-Based Metal Oxides for Absorbing Nitrogen Oxides in Oxidizing Exhaust Gas".

FIELD OF THE INVENTION

This invention is related to sol-gel manufactured single-phase metal-alumina materials. More particularly, the single phase metal-alumina material is made from particular heterometallic alkoxides which include alkali metal and optionally either or both of alkaline earth metal and lanthanide.

BACKGROUND OF THE INVENTION

Sol-gel processing allows for the low temperature preparation of aluminum oxide materials of high purity and controlled microstructure. These materials can be in such forms as gels, aerogels and xerogels. Sol-gel processes have been found useful in preparing supported and unsupported inorganic membranes for chemical sensor and separation applications, for automobile catalyst washcoats, and for optical coatings for automotive glass. For example, in U.S. Pat. No. 5,403,807 by Narula commonly assigned herewith, a method is disclosed for making a single phase metal-alumina sol-gel material which includes alkaline earth metal and optionally lanthanides. These materials are disclosed as being stable at high temperatures making them ideally useful as catalyst supports.

Significant research has been undertaken in the area of lean-burn engines, where the A/F ratio is higher than stoichiometry, in order to improve fuel economy. One approach to treating such exhaust gasses involves NOx absorbents, i.e., materials which are able to absorb nitrogen oxides from the exhaust gas during lean-burn operation and then later release them when the oxygen concentration in the exhaust gas is reduced. For example, when the A/F ratio is made rich or stoichiometric. Conventional NOx absorbents are alkaline earth metals like barium with a precious metal catalyst like platinum carried on alumina. The widely held mechanism for this absorption phenomena is that during lean-burn operation the platinum first oxidizes NO to $NO_2$ and the $NO_2$ subsequently forms a nitrate complex with the trapping material, e.g., the barium. In the regeneration mode, under a stoichiometric or rich environment, the nitrate decomposes and the NOx released is reduced catalytically over the platinum with reducing species like HC or CO in the exhaust gas.

Such conventional absorbent materials have a serious deficiency in that the barium reacts with sulfur oxides generally present in exhaust gas to form barium sulfite. This inactivates the barium for NOx absorption. It is suggested that to decompose the barium sulfate it should be subjected to elevated temperatures of at least 600° C. or more in reducing gas conditions. One negative aspect of this regeneration process is that it leads to detrimental changes in the NOx absorbent such as reduced surface area and crystallization of the aluminate phases thereby reducing the efficiency of the NOx absorbent. Alkali metals like potassium have also been suggested as NOx absorbents, however, they are even more easily deactivated by sulfur than alkaline earth metals like barium. Repeated regeneration of the absorbent by heating, as discussed above, contributes to a loss of surface area in the alumina support material and contributes toward further sintering in the platinum precious metal responsible for the conversion of NOx to $NO_2$. Precious metal sintering results in a decrease in the active sites that convert NOx to $NO_2$, and hence a decrease in the total amount of NOx trapped on the available absorbent.

It would be desirable if a NOx absorbent could be found which would be more resistant to sulfur poisoning while being a good NOx absorbent. It would also be very desirable if the improved material could withstand repeated heating to de-sulfur, i.e., reactivate the absorbent, without significantly reducing the amount of surface area.

We have now unexpectedly found that a new material made from heterometallic alkoxides provides such improvements. The material and method of making are disclosed herein.

In U.S. application Ser. No. 09/134992 filed Aug. 17, 1998 and entitled "NOx Trap Catalyst For Lean Burn Engines" commonly assigned with the present invention, a sol-gel oxide material is disclosed useful for NOx absorption. It comprises oxides of aluminum, magnesium and zirconium.

SUMMARY OF THE INVENTION

The invention is directed to materials which are (a) single phase alkali metal-aluminum-oxide materials or (b) single phase alkali metal-alkaline earth metal-aluminum oxide materials, either of which optionally may also include another metal, a lanthanide, which will hereafter be collectively referred to as single phase metal-alumina materials. These materials are made from alkoxides including heterometallic alkoxide comprising [bis(2-propanolato)] aluminum)bis($\mu$-(2-propanolato)]alkali metals; and, optionally, one or both of (ii) bis[(bis(2-propanolato)-aluminum)tetraakis-($\mu$-(2-propanolato))]alkaline earth and tris[(bis(2-propanolato)-aluminum)hexakis-($\mu$-(2-propanolato))]lanthanides. The ratio of alkali metals, alkaline earth metals, and/or lanthanide to alumina can be changed by including varying amounts of aluminum alkoxide, alkali metal alkoxide, alkaline earth metal alkoxide, or lanthanide alkoxide with the heterometallic alkoxide.

According to another aspect of the present invention, it is also directed to the method of making such preferred materials from the heterometallic alkoxides. Further it includes the sols, gels and subsequent xerogels, and aerogels so made as well as products made by calcining such materials. The materials are useful as catalyst supports, e.g., loaded with precious metals like platinum.

DETAILED DESCRIPTION OF PREFERRED EMBODIMENTS

Figure 1:
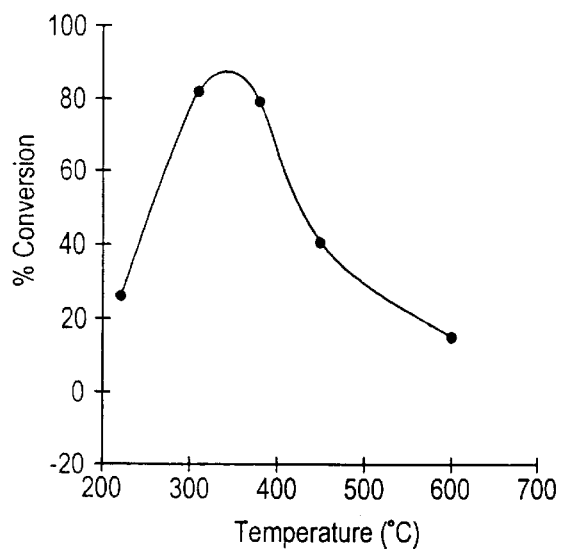
FIG. 1 is a graph showing the lean NOx trapping efficiency of an oxide according to an embodiment of the present invention synthesized by the sol-gel method.

As disclosed above, the invention is directed to specific single phase metal-alumina materials including alkali metals made from alkoxides including heterometallic alkoxides. These materials are useful as catalyst supports and particularly useful as NOx absorbents as disclosed in the related application specified above.

In use as a NOx absorbent, the exhaust gas containing carbon monoxide, hydrocarbons, and nitrogen oxides generated by a lean-burn internal combustion engine would be brought in contact with the absorbent. For the NOx absorption, the material would include precious metal which would either be deposited on the material or included with the components during sol-gel processing. Under lean-burn conditions, where the exhaust gas contains more oxygen than is required for oxidizing components to be oxidized in the exhaust gas, nitrogen oxides are absorbed on the metal oxide material and when the oxygen concentration in said gas is lowered the absorbed nitrogen oxides are desorbed from the metal oxide and reduced over the precious metal.

That is, (a) aluminum oxide and (b) the total of alkali metal oxide and/or alkaline earth metal oxide, are preferably included in weight percents respectively of (a) 20–80 wt % and (b) 80–20 wt. %. When lanthanum oxide is present, it is included in 10–50 wt. % (based on a total of 100 wt. % of these three oxides in the product). More preferably, in the product oxide, these weight percents are 87–40 wt. %, 3–30 wt. %, and 10–30 wt. % of these three oxides, respectively.

We have found that the invention single phase materials made by sol-gel techniques provides several improvements over conventional materials oxide materials In one aspect, the sol-gel processed materials are more resistant to sulfur poisoning. We believe this is because the sol-gel process offers a better distribution of alkali metals, alkaline earths, and lanthanides in alumina than impregnation methods. Thus, the particle size of the oxides of alkali metals, alkaline earths and lanthanides remains small compared to impregnation method. This provides a larger number of reaction sites for the reaction of sulfur and nitrogen with the oxides. In another aspect they are more stable to temperature cycling as occurs during engine operation because, we believe, a better distribution of alkali metals, alkaline earths, and lanthanides in alumina slows down the sintering of the NOx trap formulation. Sintering involves thermally induced migration and coalescence of the noble metal particles which causes a decrease in surface to volume ratio leaving fewer catalytic atoms or molecules on the surface of the crystal available to the reactants. Further, because the product is made by sol-gel techniques the final product comprises oxides which are joined by chemical bonds to one other in the alumina matrix. We believe this leads to the formation of high surface area alumina materials with alkaline earth or lanthanide bonded to aluminum through oxygen. This prevents collapse of the pores in alumina with the formation of aluminum-oxygen-aluminum bonds since aluminum hydroxy bonds on the surface have been replaced with bonds with alkaline earths or lanthanides. However, neither the validity nor understanding of the theories discussed above are necessary for the practice of the invention.

The technique of making the sol-solutions is well known to those skilled in the art. In the case of using alkoxides, it generally involves (1) hydrolysis of metal alkoxides in water and/or parent alcohol (acid or base can be used as catalyst if necessary) or (2) modification of metal alkoxides with organics such as acetyl-acetone and subsequent hydrolysis or (3) direct hydrolysis in water and peptization in the presence of acid. Additional discussions of sol-gel techniques as apply to the present invention will be presented further below with particular respect to the preferred alkoxides for use in the present invention NOx absorption method.

The novel invention single phase materials are made from alkoxides including certain heterometallic alkoxides. These heteroalkoxides are selected from the group consisting of: (a) alkali metal (M') and aluminum (Al) heterometallic alkoxides; (b) the combination of (i) alkali metal (M') and aluminum (Al) heterometallic alkoxides with (ii) alkaline earth (M) and aluminum (Al) heterometallic alkoxides, and optionally (c) lanthanide (Ln) and aluminum (Al) heterometallic alkoxides. This invention is also directed to materials so made. As disclosed above, these materials are preferably used as the NOx absorbing materials in oxidizing exhaust gases.

The heterometallic alkoxides disclosed above are, in detail, the following alkoxides listed with their general chemical formulas. The alkali metal-aluminum heterometallic alkoxide is [bis(2-propanolato)aluminum-bis (-$\mu$-propanolato)]-alkali metal represented by the general chemical formula M'Al(OPr$^i$)$_4$, M' being an alkali metal. When isolated from reaction mixtures, these alkoxides are polymeric solids with associated solvent molecules e.g [(Pr$^i$OH)$_2$K($\mu$-OPr$^i$)$_2$Al ($\mu$-OPr$^i$)$_2$]$_n$. The alkaline earth-aluminum hetero-metallic alkoxide is bis[bis(2-propanolato)aluminum)-tetrakis ($\mu$-(2-propanolato)]-alkaline-earth metal represented by the general chemical formula M[Al(OPr$^i$)$_4$]$_2$, M being an alkaline earth metal. The lanthanide-aluminum heterometallic alkoxide is tris [(bis(2-propanolato) (aluminum)-hexakis-($\mu$-(2-propanolato)]lanthanide represented by the general chemical formula Ln[Al(OPr$^i$)$_4$]$_3$, Ln being a lanthanide. Alkali metal is meant to include such metals as lithium (Li), sodium (Na), potassium (K), rubidium (Rb), and cesium (Cs). Alkaline earth metal is meant to include such metals as magnesium (Mg), calcium (Ca), strontium (Sr), and barium (Ba). Lanthanide is meant to include members of the lanthanide series of the Periodic Table such as lanthanum (La) and cerium (Ce). As would be apparent to one skilled in the art in view of the present disclosure, more than one such heterometallic alkoxide could be employed. That is, e.g., alkali metal-aluminum heterometallic alkoxides such as both lithium and sodium alkoxides could be employed.

Advantageously, in these materials, the metals like alkali metal and lanthanide are seen to be uniformly distributed throughout the alumina matrix of the single-phase material and chemically linked into the alumina by bridges such as metal-oxygen-aluminum or metal-hydroxide-aluminum. Also these single phase material from heterometallic alkoxides have a higher surface area than materials conventionally made from mixtures of oxides like aluminum oxide, alkali metal oxide, and optionally lanthanum oxide or their precursors, e.g., nitrates, chlorides, etc. This increased surface area is advantageous, e.g., when the material is employed for catalysis. More specifically, the special advantages for NOx absorption of using heterometallic alkoxides is believed by the inventors to be the result of the molecular distribution of alkali metals, alkaline earths and lanthanides in an alumina matrix leading to single phase materials. Such distribution further improves the thermal stability of sol-gel processed materials as compared with those prepared from a mixture of mono-metallic alkoxides.

In its broadest embodiment, the product single-phase metal-alumina materials are made by reacting water and alkoxides including the particular heterometallic alkoxides disclosed above, which techniques are described in detail in U.S. Pat. No. 5,403,807 incorporated expressly herein by reference. Using such techniques, for example, a potassium-aluminum-oxide material according to the present invention can be made from alkoxides including [(bis(2-propanolato)-aluminumbis($\mu$-(2-propanolato) potassium, $KAl(OPr^i)_4$. As with any such material made according to the present invention, the ratio of alkali metals, alkaline-earth metals and/or lanthanide to alumina can be changed by including varying amounts of one or more of aluminum alkoxide, alkaline earth alkoxides, and lanthanide alkoxides with the heterometallic alkoxide. Thus the ratio of, e.g., K to alumina is changed, according to the above example, by mixing $Al(OPr^i)_3$ with $KAl(OPr^i)_4$. A potassium lanthanum-alumina, e.g., may be prepared from $KAl(OPr^i)_4$, and $La[Al(OPr^i)_4]_3$, and optionally $Al(OPr^i)_3$.

Sol-gel technology is widely known and most commonly comprises reacting water and an alkoxide having hydrolyzable alkoxy groups. Any such technology may be used to make the preferred materials. Preferred sol-gel methods for making the novel single phase metal alumina materials according to the present invention are detailed below. Still others considered within the scope of the invention will be apparent to those skilled in the art in view of the present disclosure.

In one embodiment of the present invention for forming single-phase metal-alumina materials, an alkali metal-aluminum oxide material is formed from a heterometallic alkoxide including the steps of forming a reaction mixture from $M'[Al(OPr^i)_4]$, M'=Li, Na, K, and water, maintaining the reaction mixture at elevated temperature, removing isopropanol and water from the reaction mixture, and collecting the xerogel. According to another embodiment of the present invention, an alkali metal-alkaline earth-aluminum oxide material is formed from heterometallic alkoxides including the steps of forming a reaction mixture from $M'[Al(OPr^i)_4]$, M'=Li, Na, K, Rb, Cs; $M[Al(OPr^i)_4]_2$, M=Mg, Ca, Ba, Sr; and water, maintaining the reaction mixture at elevated temperature, removing isopropanol and water from the reaction mixture, and collecting the xerogel. According to yet another embodiment, either of above embodiments may be modified by including a lanthanide hetero-metallic alkoxide $(Ln[Al(OPr^i)_4]_3$, Ln=La, Ce) during sol-gel preparation. The steps of sol-gel processing may me modified as would be apparent to those skilled in the art in view of the present disclosure, while still obtaining the single-phase metal-aluminum materials disclosed herein.

The alumina-based metal oxide, as well as the preferred single-phase metal-alumina materials, may include minor proportions of other materials to stabilize or otherwise enhance the oxide properties. Stabilizer materials such as silica commonly included in oxide materials to be used at elevated temperatures would also be useful herein. When included they would be used in an amount up to about 10 wt. % based on the total weight of the alumina-based metal oxide.

For use in absorbing NOx as disclosed above, the alumina-based metal oxide material, which is preferably the single-phase metal-alumina material as discussed above, would include a precious metal like platinum, palladium, or rhodium or a mixture of any of them. The precious metal can be loaded on the oxide material or incorporated within the sol-gel material during processing. For example, incipient wetness techniques may be used where the oxide material can be contacted with, e.g., hexachloroplatinic acid solution to deposit platinum. The impregnated product would be dried and calcined generally before use. Alternately, the platinum could be included in the sol as, e.g., platinum 2-ethyl hexanoate. In this case, rather than the platinum being merely loaded on the metal oxide it would be included within the metal oxide.

The precious metal included in the alumina-based metal oxide incorporated in an amount of at least 0.1 wt % based on the total weight of the alumina-based metal oxide. Preferably, the precious metal is employed in an amount of 0.1 to 5 wt. % based on the weight of the oxide, more preferably being included in about 1 to 2 wt. %. For wet impregnation, as one example, the precious metal may be provided from soluble precious metal compounds. Water soluble compounds are preferred, including, but not limited to nitrate salts. In addition to this incorporation from a liquid phase, the precious metal, e.g., platinum, may be provided by sublimation of platinum chloride or other volatile platinum salts: by solid state exchange in the 300–500° C. temperature range using labile platinum compounds. Platinum is the preferred precious metal, however, when platinum is included other precious metal like rhodium in relatively small amounts is desirably also added, optimally as 1–5 wt. % rhodium based on the weight of the support. Rhodium is desirably included since it provides a broadening of the NOx conversion window due to increased conversion efficiency of nitrogen oxides at higher temperatures.

For useful application as a catalyst support, or as a NOx absorbent material in an exhaust system as disclosed herein, a coating of this material will be carried on a substrate (mechanical carrier) of a high temperature stable, electrically insulating material such as cordierite, mullite, etc. A mechanical carrier is preferably comprised of a monolithic magnesium aluminum silicate structure (i.e., cordierite), although the configuration is not critical to the absorbent/catalyst of this invention. It is preferred that the surface area of the monolithic structure provide 50–100 meter square per liter structure, as measured by $N_2$ adsorption. Cell density should be maximized consistent with pressure drop limitations and is preferably in the range of 200–800 cells per square inch of cross-sectional area of the structure. The substrate may be in any suitable configuration, often being employed as a monolithic honeycomb structure, spun fibers, corrugated foils or layered materials. Still other materials and configurations useful in this invention and suitable in an exhaust gas system will be apparent to those skilled in the art in view of the present disclosure.

A washcoat of the material (without the precious metal) may be applied to the substrate and then impregnated with the precursor precious metal solution. Alternately, the material with precious metal may be washcoated onto the substrate by forming a slurry thereof. Generally, the oxide is provided first on the substrate and then impregnated with a precious metal precursor. Still other ways of providing the invention material for use will be apparent to those skilled in the art in view of the present disclosure, the method not being critical to the present invention. Generally, for use in an exhaust system this impregnated washcoat is subjected to elevated temperatures to decompose and eliminate the functional group of the precious metal precursor. It may be further subjected to calcining. Optimally, the substrate carries a washcoat of the final absorbent material in an amount of between about 20% and 40% by weight based on the weight of the substrate (e.g., monolith).

If the material is placed in use in an exhaust gas conduit, oxygen present in the exhaust gas will oxidize the precious metal like platinum to platinum oxide which at high temperatures decomposes to platinum and oxygen. Thus it often exists as a mixture of platinum and its oxides.

EXAMPLE 1

An alkoxide mixture of, NaAl(OPr$^i$)$_4$, (1.52 g) and Al(OiPr)$_3$ (9.73 gr)in tetrahydrofuran (THF) is added to 200 ml water at 80° C. with stirring. The volatiles are removed at 90° C. The resulting powder is collected and pyrolyzed at 400° C. The BET surface area of powder is 263 m/g and the NOx absorption efficiency is 82% at 310° C. as shown in FIG. 1.

EXAMPLE 2

Figure 2:
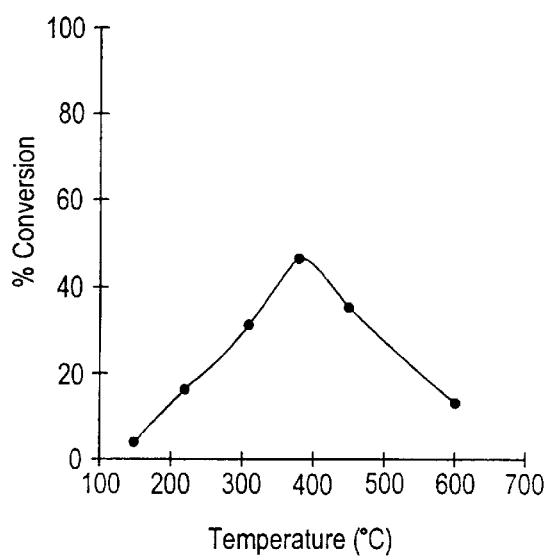
FIG. 2 is a graph showing the lean NOx trapping efficiency of an oxide according to an embodiment of the present invention synthesized by the sol-gel method.

An alkoxide mixture of LiAl(OPr$^i$)$_4$, (1.81 g), Ba[Al(OPr$^i$)$_4$]$_3$ (0.43 g) Al(OPr$^i$)$_3$ (1.57 g) in tetrahydrofuran (THF) is added to 200 ml water at 80° C. with stirring. The volatiles are removed at 90° C. The resulting powder is collected and pyrolyzed at 600° C. The BET surface area of powder is 78.3 m$^2$/g and the NOx absorption efficiency is 47% at 380° C. as shown in FIG. 2.

EXAMPLE 3

Figure 3:
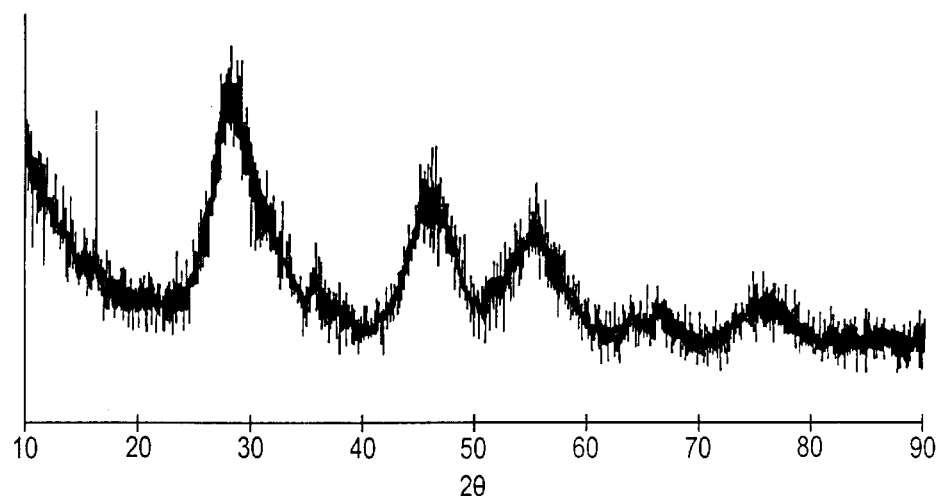
FIG. 3 is a X-ray Diffraction of a present invention embodiment single phase metal oxide synthesized by the sol-gel method.

An alkoxide mixture of Li(OPr$^i$) (1.06 g), LiAl(OPr$^i$)$_4$ (1.08 g), La[Al(OPr$^i$)$_4$]$_3$ (3.72 g), and Ce[Al(OPr$^i$)4]$_3$ (3.72 g) in tetrahydrofuran (THF) is added to 200 ml water at 80° C. with stirring. The volatiles are removed at 90° C. The resulting powder is collected and pyrolyzed at 400° C. The BET surface area of the powder is 174 m$^2$/g and the NOx trap efficiency is 70% at 380° C. FIG. 3 shows X-ray diffraction of this material and shows that the lithium, lanthanum and aluminum oxides are amorphous.

Figure 4:
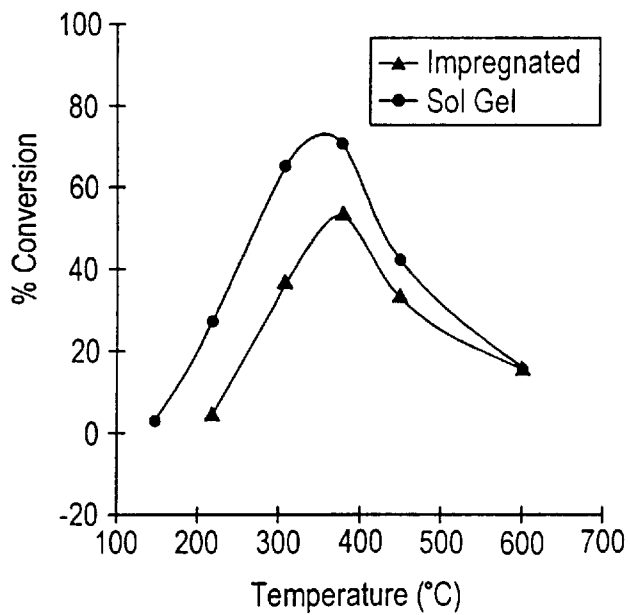
FIG. 4 is a graph showing the comparison of lean NOx trapping efficiency of a present invention embodiment oxide synthesized by the sol gel method and an oxide not according to this invention.

A comparative example, i.e., not according to this invention, is made by suspending commercial γ-alumina (1.43 g) in water and adding a solution of lithium nitrate (1.38 g), lanthanum nitrate hexahydrate (1.73 g) and cerium nitrate hexahydrate (1.74 g) to this suspension, drying and pyrolyzing. This material is not made by sol-gel process teachings. The BET surface area of the powder is 21 m$^2$/g and the NOx trap efficiency is 53% at 380° C. as shown in FIG. 4. FIG. 4 clearly shows that materials prepared according to the teachings of this invention are superior NOx absorbents.

EXAMPLE 4

Figure 5:
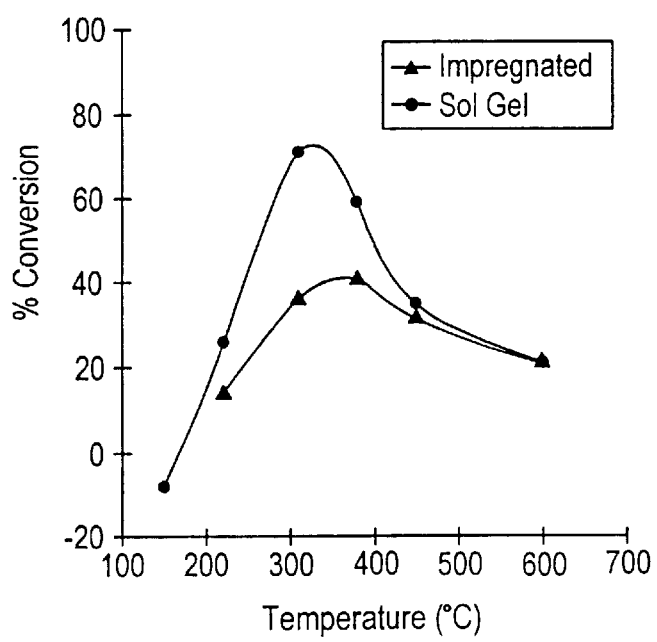
FIG. 5 is a graph showing the comparison of lean NOx trapping efficiency of a present invention embodiment oxide synthesized by the sol gel method and a comparative example oxide not according to this invention.

An alkoxide mixture of CaAl(OPri)$_4$ (2.44 g), La[Al(OPri)$_4$]$_3$ (4.0 g) and Ce[Al(OPri)$_4$]$_3$ (4.0 g) in isopropanol is cooled to −78° C. and treated with 2.48 g water in isopropanol. The volatiles are removed after warming to room temperature. The resulting powder is collected and pyrolyzed at 400° C. The BET surface area of the powder is 127 m$^2$/g and the NOx trap efficiency is 71% at 310° C. A comparative example, i.e., not according to this invention, is made by suspending commercial γ-alumina (1.76 g) in water and adding a solution of calcium nitrate tetrehydrate (1.02 g), lanthanum nitrate hexahydrate (1.87 g) and cerium nitrate hexahydrate (1.87 g) to this suspension, drying and pyrolyzing. This material is not made by sol-gel process teachings. The BET surface area of the powder is 29 m$^2$/g and the NOx absorption efficiency is 41% at 380° C. (FIG. 5). FIG. 5 clearly shows that materials prepared according to the teachings of this invention are superior NOx absorbents.

We claim:

1. A metal-alumina material made by sol-gel techniques from alkoxides comprising heterometallic alkoxides comprising:(i) (bis-(2-propanolato)-aluminum)bis-($\mu$-(2-propanolato) alkali metals; and, optionally, one or both of (ii) bis(bis(2-propanolato)-aluminum)tetraakis-($\mu$-(2-propanolato))alkaline earth and tris(bis(2-propanolato)-aluminum)hexakis-($\mu$-(2-propanolato))lanthanides, which includes oxides of aluminum, alkali metal, lanthanide, and optionally alkaline earth metal.

2. The material according to claim 1 wherein said alkali metal is selected from lithium, sodium, potassium, and cesium and said alkaline earth is selected from barium, calcium, and strontium, and said lanthanide is selected from lanthanum and cerium.

3. The material according to claim 1 where said alkoxides further comprise aluminum, alkali metal, alkaline earth, or lanthanide mono-metal alkoxides.

4. The material according to claim 1 which is made by sol-gel techniques including reacting water and said heterometallic alkoxides.

5. The material according to claim 4 wherein said techniques comprise:

forming a reaction mixture from water and said heterometallic alkoxides; and adding acid to said reaction mixture to form a sol.

6. The material according to claim 5 wherein said techniques further comprise heating said reaction mixture prior to the addition of said acid.

7. The material according to claim 6 wherein said method further comprises removing from said reaction mixture alcohol formed as a result of hydrolysis of said heterometallic alkoxides.

8. The material according to claim 1 wherein said material comprises 20–80 wt. % aluminum oxides and 80–20 wt. % of the total of alkali metal oxides and alkaline earth metal oxides.

9. A metal-alumina material made by sol-gel techniques from alkoxides comprising heterometallic alkoxides comprising: (i) (bis(2-propanolato)-aluminum)bis-($\mu$-(2-propanolato)alkali metals; and, optionally, one or both of (ii) bis(bis(2-propanolato)-aluminum)tetraakis-($\mu$-(2-propanolato))alkaline earth and tris(bis(2-propanolato)-aluminum)hexakis-($\mu$-(2-propanolato))lanthanides, which further includes at least 0.1 wt. % precious metal selected from the group consisting of platinum, rhodium, palladium, and a mixture of any of them, either incorporated in the metal-alumina material during processing by sol-gel techniques or deposited on the metal-alumina material.

10. A method for making a metal-alumina material by sol-gel techniques which comprises:

reacting (A) water and (B) alkoxides including heterometallic alkoxide comprising bis(2-propanolato)-aluminum) bis-($\mu$-(2-propanolato)alkali metals; and, optionally, one or both of (ii) bis(bis(2-propanolato)-aluminum)tetraakis-($\mu$-(2-propanolato))alkaline earth and tris(bis(2-propanolato)-aluminum)hexakis-($\mu$-(2-propanolato))lanthanides.

11. The method according to claim 10 which comprises forming a reaction mixture from water and said alkoxides;

maintaining the reaction mixture at a temperature to form a gel thereof; and adding an acid to said gel to convert said gel to a sol.

12. The method according to claim 10 which further comprises the step of applying a coating of said sol to a substrate and heating said coating to a temperature above about 300° C. to calcine said coating.

* * * * *